United States Patent [19]
Krupick et al.

[11] 3,843,108
[45] Oct. 22, 1974

[54] VIBRATION AND SHOCK ISOLATED GYROSCOPE ASSEMBLY

[75] Inventors: Walter J. Krupick, Succasunna; Theodore J. McDonough, Bloomfield, both of N.J.

[73] Assignee: The Singer Company, Little Falls, N.J.

[22] Filed: Jan. 31, 1973

[21] Appl. No.: 328,389

[52] U.S. Cl. ................................... 267/137, 74/5
[51] Int. Cl. ............................................. F16f 7/04
[58] Field of Search .................. 267/136, 137; 74/5

[56] References Cited
UNITED STATES PATENTS

| | | |
|---|---|---|
| 3,661,375 | 5/1972 | Krupick .............................. 267/137 |
| 3,734,484 | 5/1973 | Hall ................................... 267/137 |

Primary Examiner—Robert J. Spar
Assistant Examiner—George F. Abraham
Attorney, Agent, or Firm—T. W. Kennedy

[57] ABSTRACT

An assembly in which two rotating members, such as the rotating elements of a flexure supported free rotor gyroscope, are intercoupled in a manner to provide isolation and damping of relative movement therebetween. Specifically, an isolator damping mechanism is provided between the drive shaft and flexure support assembly of the gyroscope flywheel in the form of elastomer elements which absorb axial and radial vibrations.

8 Claims, 2 Drawing Figures

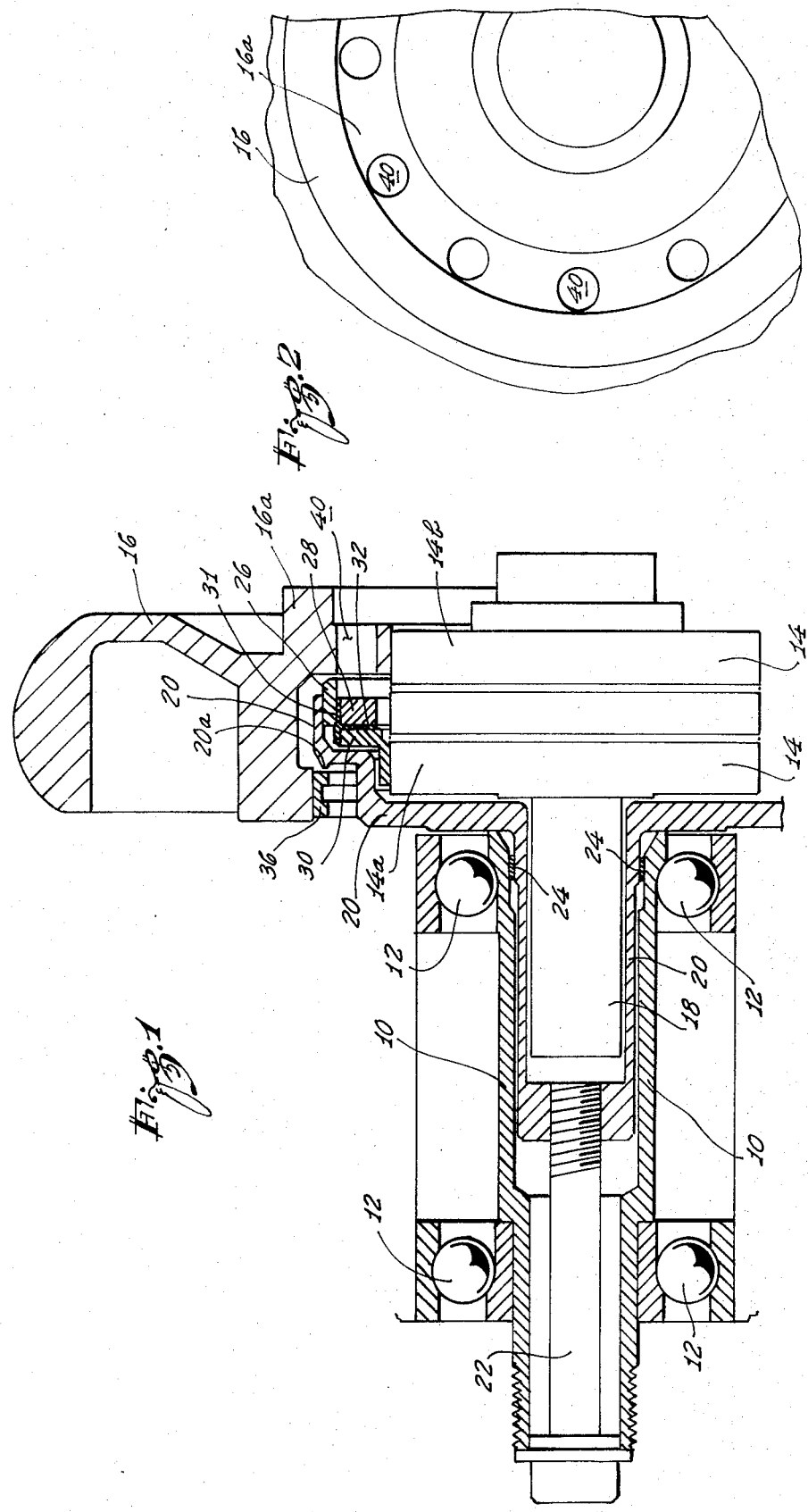

3,843,108

VIBRATION AND SHOCK ISOLATED GYROSCOPE ASSEMBLY

BACKGROUND OF THE INVENTION

Isolator damping mechanisms of the general type with which the present invention is concerned are described, for example, in U.S. Pat. No. 3,661,375 which is assigned to the present assignee. In that patent, a damper mechanism is provided for connecting the drive shaft to the flexure support assembly of the gyroscope. Said mechanism comprises a pair of spaced telescoped coupling sleeves respectively secured to the shaft and to the flexure support, and means between the sleeves for providing an effective spring resistance to relative radial and axial movement thereof.

The assembly described in the patent has proven to be effective in practice and commercially feasible. However, the assembly of the present invention is less complex and, unlike the assembly described in the patent, does not result in angular vibrations of the gyroscope flywheel in the presence of radial linear vibration inputs. In the assembly of the patent, the isolator damping mechanism supports the flywheel of the gyroscope in a cantilever manner which results in the aforesaid effects which, in turn, produce additional bias terms. This means that the gyroscope incorporating the isolation damping mechanism of the patent is more difficult to calibrate than one incorporating the teaching of the present invention which is compensated so that it does not produce such bias terms.

BRIEF DESCRIPTION OF THE DRAWINGS

FIG. 1 is a partial sectional view of a free rotor flexure supported gyroscope incorporating the concepts of the invention and including a flywheel, a flexure assembly, an isolator mechanism, and stop elements, all in accordance with the teachings of the present invention; and FIG. 2 is a partial end view of the gyroscope assembly of FIG. 1.

DETAILED DESCRIPTION OF THE ILLUSTRATED EMBODIMENT

The free rotor gyroscope illustrated in the drawing comprises a drive shaft 10 which is rotatably supported in appropriate bearings 12. The drive shaft is driven, for example, by a high speed motor (not shown). The gyroscope shown in the drawings includes a flexure assembly 14 which supports a flywheel 16 in accordance with free rotor gyroscopic principles. The flexure assembly 14 includes a shaft 18 which extends into one end of the drive shaft 10 in coaxial relationship with the drive shaft, as shown.

The flexure assembly 14 may, for example, be of the type described in U.S. Pat. Nos. 3,585,866; 3,354,726; 3,614,894; or 3,527,062. The isolator mechanism of the present invention serves to couple the drive shaft 10 to the flexure assembly 14 in a manner to provide damping of said axial and radial vibrations between the drive shaft and the flexure assembly.

The intercoupling isolator mechanism includes a sleeve 20 which extends into the drive shaft 10 in concentric and telescoped relationship with the shaft 18. The sleeve 20 is connected to the drive shaft by means of a bolt 22 which engages one end of the drive shaft and which is threaded into the end of the sleeve 20. In addition, the sleeve is cemented to the drive shaft at 24, as shown.

As shown in FIG. 1, for example, the right hand end of the sleeve 20 has an increased diameter with respect to the portion of the sleeve surrounding the shaft 18, so that the right hand extremity of the sleeve surrounds the flexure assembly. The isolator mechanism comprises three rings designated 26, 28 and 30. The ring 26 is mounted coaxially with the sleeve 20 and with the flexure assembly 14, and is telescoped into the end of the sleeve 20 and attached thereto. The ring 30 is mounted concentrically with the flexure assembly and is attached thereto. The ring 28 is mounted adjacent the ring 30 in coaxial relationship therewith, and is telescoped into the ring 26, as shown. The rings 26, 28 and 30 are molded to one another by elastomer sections 31 and 32.

As shown, the flexure assembly 14 actually comprises a hub 14a and a hub 14b which are constructed and intercoupled in a manner known to the art, such as described, for example, in the patents listed above. The ring 30 is attached to the hub 14a, and the flywheel 16 is attached to the hub 14b. As described in the patents, the flexure assembly serves as a universal resilient hinge assembly for interconnecting the rotor of the gyroscope to the drive shaft. An annular member 36 is attached to the flywheel 16 as part of a dual stop assembly.

In the operation of the gyroscope, any axial input vibrations cause the sleeve 20 to move the ring 26 relative to the ring 28 producing a shear movement in the elastomer section 31. The elastomer section 32 is relatively stiff in the axial direction so that most of the motion occurs in the elastomer section 31. Radial input vibrations, on the other hand, cause the sleeve 20 to produce relative motion between the rings 28 and 30, causing a shear force to be exerted on the elastomer section 32. The elastomer material has relatively high damping to limit the gain at the mechanical resonance point of the assembly.

It will be appreciated that the isolator mechanism made up of the rings 26, 28, 30 and the elastomer sections 31 and 32 may be positioned relative to the flywheel 16 so that the mass of the flywheel and of the flexure assembly 14 is centered with respect to the isolator assembly. When that is achieved, radial vibration inputs produce essentially no corresponding angular movements. The desired position is achieved essentially when the center of the isolated mass of the flywheel and flexure assembly is centered with respect to the ring 26. However, since the flywheel and isolator assembly are supported in a cantilever manner on the bearings 12 there is a tendency for some angular vibration as a result of radial inputs to the bearings. This tendency is compensated in the illustrated assembly, however, by offsetting the mass of the flywheel and of the flexure assembly from the ring 28. This offset position can be obtained by selecting a particular length for the ring 26; and by a predetermined setting of the telescoped position of the ring 28 relative to the ring 26.

The flywheel 16 has a hub portion 16a which is disposed in facing relationship with the end of the ring 26 to constitute a first stop for the gyroscope assembly. Likewise, the sleeve 20 has an annular section 20a in facing relationship with the annular member 36 to constitute a second stop for the assembly. In this way, the isolator mechanism of the invention also serves as a dual stop assembly for the flywheel 16. The elements of the dual stop assembly can be properly positioned by placing equal shims in approximately three equally spaced points through holes 40 in the rotor, and in corresponding three equally spaced points between the elements 20a and 36.

The isolator mechanism consisting of rings 26, 28 and 30 are molded together by use of an elastomer at sections 30 and 31. With the shims initially in place in the holes 40 the isolator mechanism is cemented to the flexure hub 14a and the flywheel 16 is cemented to hub 14b. Then shims are placed between the elements 20a and 36 and the sleeve 20 is positioned and cemented to ring 26 and the annular member 36 is positioned and cemented to the flywheel 16. Both sets of shims are kept in place during the cure of the cement to achieve the desired stop clearance. The cured assembly is then positioned and cemented at 24.

The dual stop assembly provided by the isolator mechanism of the invention serves to limit the forces exerted on the flexure assembly 14. If the stop could be perfectly centered, the annular member 36 and the flywheel 16 would come into simultaneous contact, and no force would be exerted on the flexure assembly 14. There are limitations, however, to which this centering can be accomplished, and the resultant force seen by the flexure assembly is proportional to the stop error provided by the combined compliance of the axial flexure and axial isolator. Typically the isolator is five times more compliant than the axial flexure so that the resultant force seen on the flexure in a typical case is 1/6 for a given stop misalignment error.

The invention provides, therefore, an improved assembly in which the flexure elements of a free rotor gyroscope are connected to the drive shaft through an isolator mechanism, in which the isolator elements are essentially stressed in shear, in which the center of the isolator mechanism is essentially at the center of gravity of the supported mass, and in which the isolator mechanism may form part of a dual stop system for the gyroscope.

The assembly of the invention is advantageous over the prior art since it provides improved performance with a less complex and less costly structure. The assembly of the invention, for example, is formed of fewer and simpler parts than the corresponding prior art assemblies, and it involves a simple molded isolator mechanism of high reliability. The isolator mechanism of the invention also has an advantage in that it may provide a dual stop function. Also, static balancing of the gyroscope assembly incorporating the isolator mechanism in accordance with the invention is simpler due to elimination of angular coupling.

In the operation of the gyroscope assembly of the invention restraint changes due to changes in angular coupling are eliminated. Reduced angular coupling changes in the assembly of the invention decrease twice rotor speed errors which are inherent in gyroscopes of the general type with which the invention is concerned. High rotating stresses on the isolator mechanism due to the gyroscope driving into the stop elements are eliminated. The major stresses on the isolator mechanism in the assembly of the invention are in the axial direction and are a maximum equal to the error in stop setting multiplied by the combined spring rate of the isolator mechanism and of the axial flexure assembly.

In the prior art free rotor flexure supported gyroscope construction the stop member is usually made compliant, so that higher rates cause greater angular excursions of the gyroscope rotor, so that the clearances of the pick-off to the rotor must be relatively large. In the assembly of the present invention, however, most of the angular motion is taken up by a relatively rigid element, such as the sleeve 20, and the angular excursions are limited to the stop clearance plus the error in stop setting. Thus, a smaller pick-off clearance is possible in the gyroscope assembly of the present invention as compared with the prior art assemblies, or a greater stop clearance may be provided, both of which result in lower restraint errors.

The isolator mechanism of the present invention has a higher load capability in the axial direction, compared with the usual prior art assemblies, in that the elastomer sections 31 and 32 will deflect an amount equal to one-half the total stop clearance in the axial direction before the stop engage, so that overstressing of the elastomer sections is prevented.

It will be appreciated that although a particular embodiment of the invention has been shown and described, modifications may be made. It is intended to cover all such modifications in the following claims.

What is claimed is:

1. In a gyroscope assembly, or the like, a drive shaft rotatable about a spin axis; a rotatable rotor coaxial with said spin axis; and a mechanism for intercoupling said drive shaft and said rotor to provide isolation and damping of relative movement between the drive shaft and the rotor, said mechanism including:
   a sleeve member coaxial with said spin axis and affixed to said drive shaft for rotation thereby, said sleeve member having an end extending into telescoped concentric radially spaced relationship around a portion of said rotor;
   a first ring coaxial with said spin axis telescoped into said end of said sleeve member and surrounding said portion of said rotor;
   a second ring surrounding said portion of said rotor in concentric relationship therewith and afixed thereto;
   interconnecting means including a third ring concentrically disposed within said first ring and in radial facing relationship with said second ring and having elastomer sections disposed between said first and third rings and between said second and third rings, said means interconnecting said first ring and said second ring.

2. The combination defined in claim 1, in which said portion of said rotor comprises a flexure assembly having a first hub element attached to said first ring member, and further having a second hub element, and in which said rotor comprises a flywheel mounted on said second hub element of said flexure assembly.

3. The combination defined in claim 1, in which said sleeve member includes a portion extending coaxially into one end of said drive shaft.

4. The combination defined in claim 2, in which said rotor includes a rim member positioned in axially spaced relationship with a portion of said sleeve member to constitute a first stop for the assembly, and in which said rotor includes a portion in axially spaced relationship with said first ring to constitute a second stop for the rotor.

5. In a gyroscope assembly, or the like, a drive shaft rotatable about a spin axis; a rotor coaxial with said spin axis and including a flywheel and a flexure assembly concentrically mounted with said flywheel, said flexure assembly including a first hub section and further including a second hub section affixed to said flywheel, and a mechanism for coupling said drive shaft to said first hub section of said flexure assembly to provide isolation and damping of relative movement between the drive shaft and the rotor, said mechanism including:
- a sleeve member coaxial with said spin axis and affixed to said drive shaft for rotation thereby, said sleeve member having an end extending into telescoped concentric radially spaced relationship around the periphery of said flexure assembly;
- a first ring telescoped into said end of said sleeve member and attached thereto, said first ring being coaxial with said spin axis and surrounding the periphery of said flexure assembly;
- a second ring concentric with said first hub section of said flexure assembly in concentric relationship therewith and affixed thereto;
- a third ring coaxial with said spin axis positioned concentrically within said first ring and axially adjacent said second ring;
- a first elastomer section interposed between the peripheral surface of said third ring and the inner surface of said second ring; and
- a second elastomer section interposed between the adjacent radial faces of said first ring and of said third ring.

6. The combination defined in claim 5, and which includes an annular member affixed to said flywheel and spaced axially from a portion of said sleeve member to constitute a first stop for the gyroscope, and in which said flywheel includes a hub portion spaced axially from said first ring member to constitute a second stop.

7. The combination defined in claim 6, in which said sleeve member includes a further portion of reduced diamter with respect to said end and which extends into telescoped relationship with said drive shaft coaxial about said spin axis.

8. The combination defined in claim 7, and which includes a bolt extending through said drive shaft and into said sleeve for adjusting the relative axial positions of said sleeve and said drive shaft.

* * * * *